C. W. MICHAEL.
GANG PLOW.
APPLICATION FILED MAY 8, 1913.
1,335,123.
Patented Mar. 30, 1920.
4 SHEETS—SHEET 1.
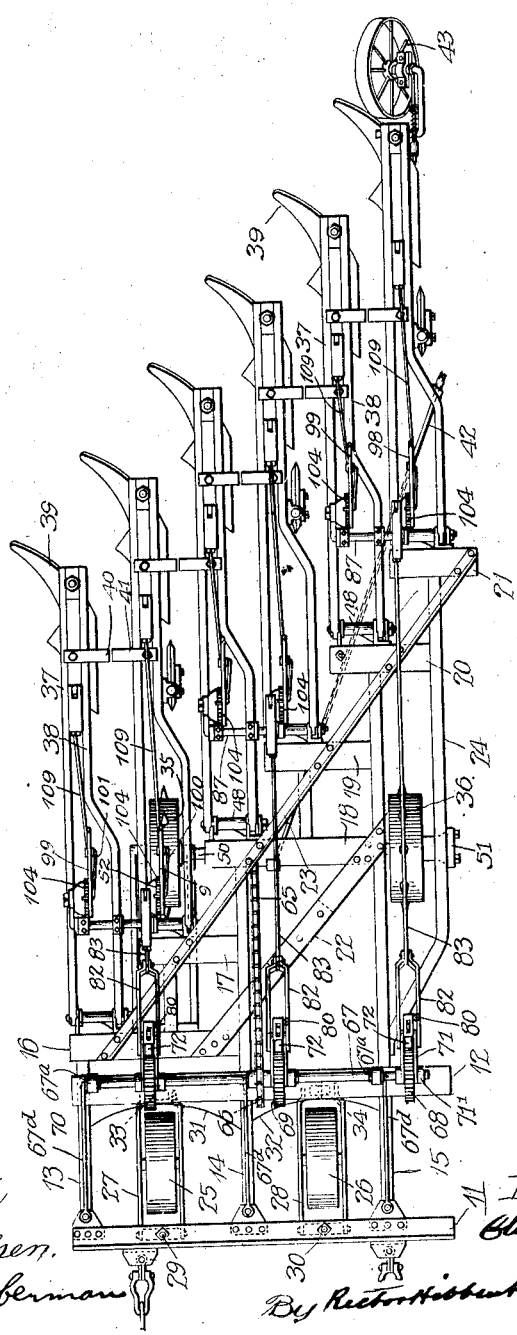
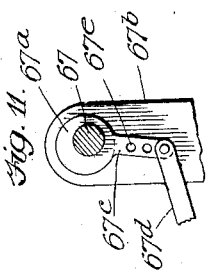

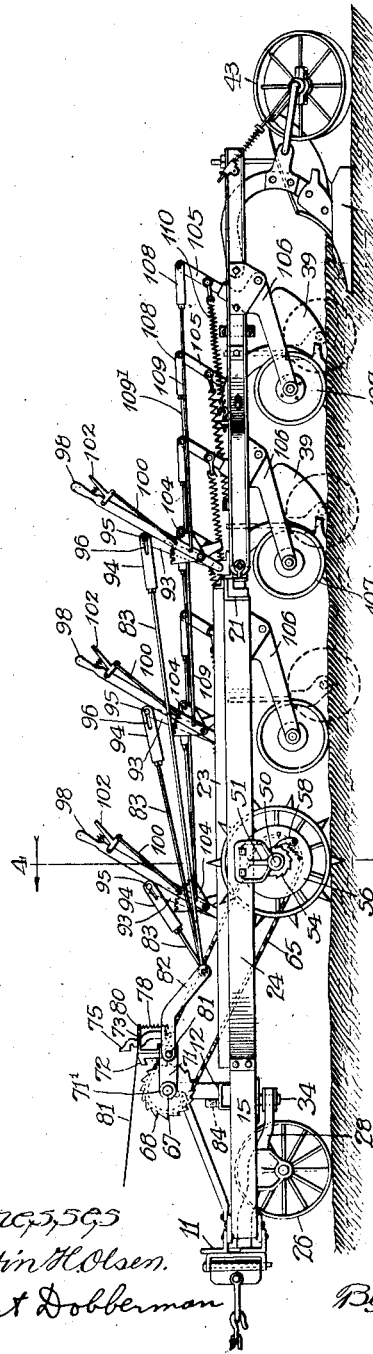

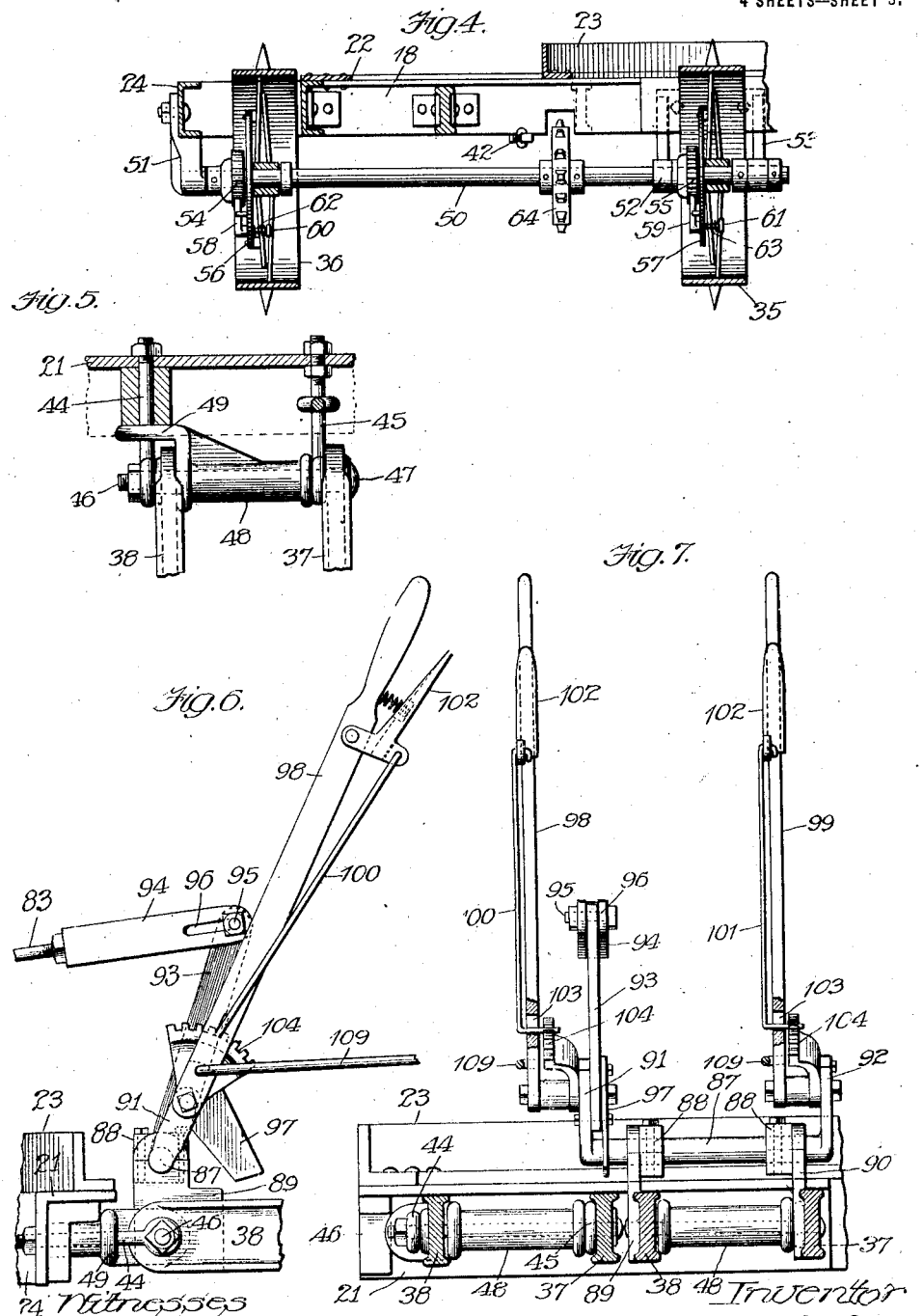

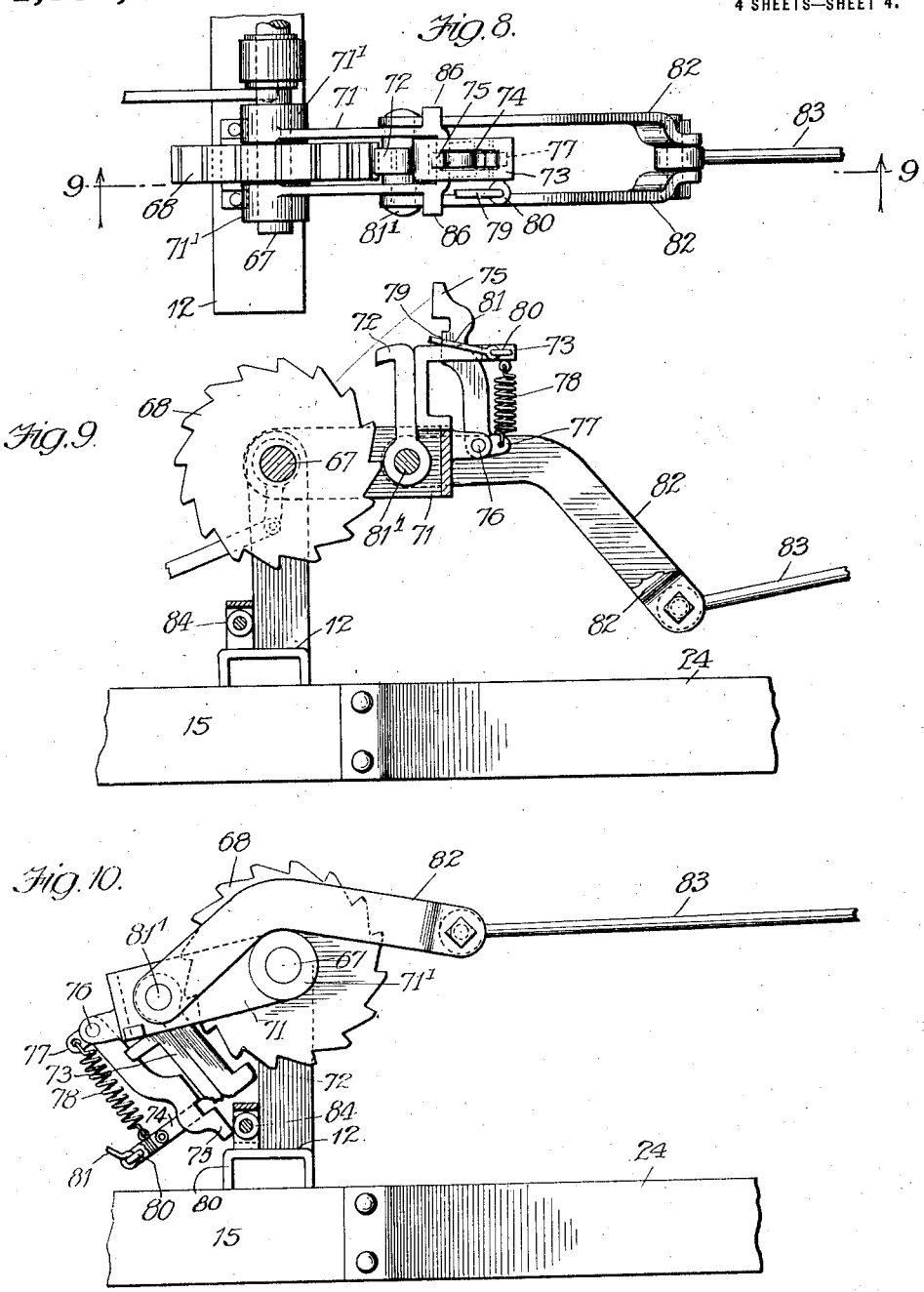

UNITED STATES PATENT OFFICE.

CLEMENT W. MICHAEL, OF RACINE, WISCONSIN, ASSIGNOR TO J. I. CASE PLOW WORKS, OF RACINE, WISCONSIN, A CORPORATION OF WISCONSIN.

GANG-PLOW.

1,335,123.  Specification of Letters Patent.  Patented Mar. 30, 1920.

Application filed May 8, 1913. Serial No. 766,360.

*To all whom it may concern:*

Be it known that I, CLEMENT W. MICHAEL, a citizen of the United States, residing at Racine, in the county of Racine and State of Wisconsin, have invented certain new and useful Improvements in Gang-Plows, of which the following is a specification.

My invention relates more particularly to means for raising the plow bodies when desired either for passing over an obstruction or for moving the plow without operating upon or disturbing the ground over which it is passing. My invention is more particularly designed for use in connection with that form of gang plow drawn by some form of traction engine though, as will appear from the following description and the accompanying drawings, it is also applicable to animal-drawn plows and other agricultural implements.

The gang plow in common use prior to this invention consists of a rigid frame mounted upon suitable ground wheels to the rear edge of which is attached a series or gang of plow members arranged on an incline or *en échelon* transversely of the machine, the plow beams being pivoted to stepped cross-pieces or girders arranged along the rear edge of the stationary frame. Upon the frame is mounted one or more handles connected to the several plows for raising the same. It has been found, however, that this imposes an unnecessary amount of physical labor upon the man operating the plow, and various expedients have been proposed for transferring the labor or work to the traction means under the control of the operator. My invention relates more specifically to this class of devices.

The preferred form of the invention is illustrated in the accompanying drawings and specifically described in the following specification for the purpose of exemplification, it being understood, however, that the invention may be embodied in various other forms of implements. The scope of the invention may be gathered from the following claims in which I have endeavored to distinguish it from the prior art, so far as known to me without, however, abandoning or relinquishing any portion thereof.

In the accompanying drawings Figure 1 is a plan view of the preferred embodiment of my invention; Fig. 2 is a side elevation of the same, showing the plow bodies in depressed working position; Fig. 3 is a similar view showing the plow members raised, however; Fig. 4 is a cross-section upon the line 4—4 of Fig. 2 looking in the direction of the arrows; Fig. 5 is a sectional detail on an enlarged scale upon a horizontal plane, showing the manner of attachment of the plow beams; Figs. 6 and 7 are details on an enlarged scale, in side elevation, and transverse section respectively, showing a portion of the means for raising the plow members; Fig. 8 is a plan view of another portion of the means for raising the plow members; Fig. 9 is a vertical elevation of the same in section upon the line 9—9 of Fig. 8; Fig. 10 is an elevation partly in section of the same showing the parts, however, in another position; and Fig. 11 is a sectional detail showing a construction to be described later. The same reference character is applied to each part wherever it occurs throughout the several views.

The wheeled frame to which reference has been made, in the particular embodiment of my invention disclosed in the drawings, comprises a pair of transverse beams 11—12, spaced apart as best shown in the plan view Fig. 1, and connected by longitudinal members 13, 14, 15, which are extended beyond the rear cross-beam 12 to different distances and connected to each other and to the other members of the frame by the several cross-beams 16, 17, 18, 19, 20, arranged in stepped relation across the rear of the frame and to which the plow beams are severally pivoted. Two diagonal struts or braces 22, 23 also assist in giving rigidity to the structure, and a rearmost cross-piece 21 is further braced and supported by the bent longitudinal beam 24 which is secured thereto at its rear end and at its front end to the extension of the longitudinal beam 15. The front wheels 25, 26 upon which the frame is supported, are journaled in swinging frames 27, 28 pivoted to the front cross-beam 11 at 29, 30 respectively, and extending beneath the rear beam 12, which is formed or provided with arcuate extensions 31, 32, against the under face of which anti-friction rollers 33, 34, carried by said pivoted frames, bear, so that the front wheels are allowed a swinging movement and yet fully support the frame at this point. The rear portion of the frame is supported on a pair of ground wheels 35, 36, the construction and mounting of which will be described later. As heretofore stated, the cross-beams 16, 17, 18, 19, 20, 21 are arranged in stepped relation to each other and it should be added, are preferably substantially equidistant from each other and are severally equipped with means for attaching the plow beams thereto. In the form shown the plow beams are composite, consisting of a straight and a bent member, 37, 38 upon which the plow bodies 39 are suitably mounted and which are provided with bumpers 40, 41 for maintaining their proper lateral relation. An inclined guy or tie 42, connected to the rearmost plow beam and to the frame serves to partially sustain the lateral strain upon the beams when the implement is at work and the rearmost beam is also provided with a furrow wheel 43. The combination of the bumpers, guys and wheel just described are not claimed herein but form the subject matter of a copending application No. 678,393 filed February 17, 1912.

The means for connecting the plow beams to the frame is best shown in Fig. 5. It consists in the case of each plow beam of a pair of eye-bolts 44, 45 through the eyes of which extends the bolt 46 which also passes through suitable openings in the inner ends of the beam members 37, 38. The member 37 is outside of the eye-bolt 45 and between the same and the head 47 of the pivot bolt 46, but the member 38 is between the eye-bolts, and in order to retain it in position, a sleeve 48 surrounds the pivot bolt and is maintained in position by means of a lug 49 through which the bolt 44 passes.

As thus far described the gang plow does not essentially differ from certain other implements of the same general character of the prior art, and, *per se*, forms no part of my present invention. It is also old to provide plows of this character with power means for raising the plow bodies. In the particular means, however, by which this is accomplished, resides the principal feature of my invention. For this purpose a transverse shaft is mounted upon the frame and normally revolved from some suitable source of power, as for example as shown in the construction chosen to illustrate my invention, from the rear ground wheels, and means are provided at suitable intervals along the shaft, adapted to be engaged at the will of the operator with the shaft to elevate the several plows. The rear ground wheels 35, 36 as shown in Fig. 4 are loosely mounted upon a shaft 50 which in turn is journaled at one end in a bracket 51 depending from the beam 24 and at the other, in brackets 52, 53 projecting rearwardly from the cross-piece 16 and arranged upon opposite sides of the ground wheel 35. In order to impart revolution to the shaft 50 from the ground wheels, it is provided with a pair of ratchets 54, 55 rigidly mounted thereon adjacent the respective ground wheels and the latter carry disks 56, 57 upon which are mounted pawls 58, 59, engaging the ratchets, suitable spring means being provided for keeping them in contact therewith. The pawls are pivoted to the disk by means of shafts 60, 61, journaled in and extending through said disks and headed upon the ends opposite the pawls, a spring 62, 63 being compressed between the headed end of each shaft or pin and the adjacent side of the disk so that the pawl is normally kept in position to engage its ratchet, but may be forced out of the plane thereof against the spring pressure, when for any reason it is desired to disengage those parts. It will thus be seen that when either ground wheel is forwardly driven, as in the forward movement of the plow, it will correspondingly turn the shaft 50; but reverse movement will not affect said shaft, as the pawl will merely click over the ratchet.

Upon the shaft 50 is secured a sprocket 64 which is connected by a chain 65 with a sprocket 66 upon the cross shaft 67 above referred to which is continuously revolved thereby and may be connected up, when desired, with any or all of the plow beams for raising the same. Shaft 67 is eccentrically mounted in bearing blocks 67ª in uprights 67ᵇ which bearing blocks are provided with arms 67ᶜ connected by links 67ᵈ with the forward ends of the members 13, 14, and 15, the connection being capable of adjustment by a series of openings 67ᵉ in order to vary the tension upon the chain 65. In the particular gang plow shown, the plow bodies and beams, which together with the elements carried thereby I have designated herein as the plow members, are six in number and since it is designed to connect two of the beams together to the cross shaft by the same mechanism, but three such mechanisms are required. Therefore, the shaft as shown is equipped with three ratchets 68, 69, 70, in line respectively with alternate plow beams, (see Fig. 1). A yoke or double arm 71 is pivoted at its ends to the shaft upon opposite sides of each ratchet wheel spanning the periphery of the same, and carries a pawl 72 which is pivoted between the legs thereof in position to be thrown into engagement with the ratchet (see Figs. 8, 9, 10). Upon the back of each pawl is mounted a catch plate 73 which is formed with a slot 74 through which extends a notched latch 75 pivoted at 76 to lugs upon the yoke 71. Between a lateral extension 77 on the latch and the catch plate 73 is mounted a tension spring 78 which serves both to hold the pawl 72 normally retracted and to maintain the latch 75 in position with its forward face 79 in contact with the wall of the slot in the catch plate. Upon the side of the catch plate is mounted an eye 80 to which is tied the end of a rope 81 by which the yoke and pawl are manually controlled from some convenient position. When the parts are in the normal position shown in Fig. 9, a pull upon either of the ropes throws the pawl to which it is attached into engagement with its ratchet wheel and at the same time the latch mounted on the yoke carrying said pawl under the influence of its spring engages its catch plate preventing premature or accidental disengagement of the pawl. The pin 81' upon which the pawl 72 is mounted extends beyond the sides of the yoke and a pair of side links 82—82, are mounted upon its opposite ends and secured to an operating rod 83 which at its opposite end is connected to the plow members to be raised thereby in the manner to be presently described. The ratchets being constantly rotated, it is obvious that when the pawl upon any yoke is engaged with its ratchet the yoke is carried over past its dead center with reference to its connection to its plow members, the links being bent as shown to permit the necessary extent of movement. The engagement continues until the latch 75 strikes the anti-friction roller 84 upon the stationary bracket 85, which thereupon withdraws the latch from engagement with the bracket 73, and also retracts the pawl from engagement with the ratchet wheel. In the meantime, however, the yoke having swung to such a point that the pivotal point of the links 82 thereon has pased beyond the line of draft of the rod 83 through the shaft, or, in other words, beyond the dead center, the draft of the said links 82 no longer tends to swing the yoke backward and its further onward movement is prevented by the engagement of the links with the hubs 71', 71', of the yoke. The device will therefore hold the plow beams to which it is connected elevated until manual intervention by the operator. When it is desired to lower the plows controlled by the device another pull is given to the rope of sufficient power to throw the yoke upward past the dead center. Thereupon it will swing around to its original position and permit the plow beams to drop. It is to be noted, however, that the yoke is provided with side lugs 86—86 which, when the parts reach the position shown in Fig. 9, come in contact with the side links 82 and prevent the further downward movement of the yoke.

As above stated each rod 83 is connected at its rear end to a pair of beams to raise the same. For the purpose of this connection one of the beams of each pair carries a transverse oscillating shaft 87 mounted in lugs 88, 89 bolted or otherwise secured to the longitudinal members of the beam, and the beam preferably selected for this purpose is the more advanced of the pair, the shaft being ordinarily mounted substantially in the same transverse plane with the pivot of the other beam of the pair (see Figs. 2 and 3). At its opposite ends the shaft 87 is formed into upwardly extending side members 91, 92, to the former of which upon the inside thereof is bolted an upwardly extending arm 93 to the upper end of which is connected by a yoke 94 the operating rod 83 heretofore mentioned. Obviously the forward pull upon the rod 83 which occurs when the pawl is thrown into engagement with the ratchet as heretofore described rocks the shaft 87. But in order that the movements of the shaft 87, when one or both of the plows is thrown upward by contact with some obstacle, may not buckle the rod 83 or otherwise interfere with the action of the lifting mechanism, the yoke 94 is slotted as at 96 to receive the bolt 95 in the upper end of arm 93 so that considerable motion of the arm 93 is possible without moving the rod 83. The bolts by which the arm 93 is secured to the upwardly extending member 91 also secure a stop plate 97 thereto which, by coming in contact with the adjacent longitudinal member 37 of the beam, limits the backward movement of the shaft 83 and arm 93 carried thereby. Upon each of the members 91, 92 extending from the shaft 87 is pivoted a lever 98, 99 which carries a latch 100, 101 attached to a spring finger piece 102, 102 at one end and extending through a slot 103 in the lever at the other into engagement with a curved rack 104 rigidly secured to the upwardly extending member upon which the lever is pivoted so that the angular relation of each of the levers to the beam may be varied at will. As shown in Fig. 7, the lever 98 is spaced away from the member 91 and overhangs the adjacent plow beam for a purpose which will presently appear.

Upon each plow beam is mounted a lever 105, which is pivoted to a bracket plate 106, on said plow beam and carries at its lower end a gage wheel 107. To the upper end of each lever is pivoted a yoke 108, connected by rod 109, with one of the levers 98, 99, above described. In normal operation levers 105, are in the position shown in Fig. 2 with their lower ends extending forwardly, but when it is desired to raise the pair of plow beams the oscillation of the shaft 87 and its attached levers 98 99 under the pull of the operating rod swings levers 105, about their pivots so that they exert a downward thrust upon the surface on which the gage wheels bear and raise the plow beams to which they are attached. In order to assist the operation of these levers 105, they are connected by tension springs 110 with points 111 forward thereof upon the plow beam. By adjusting the levers 98 99 along their arcuate racks the position of the gage wheels may be adjusted and the depth of the furrow varied at will.

The operation of the implement has perhaps been sufficiently described in connection with the detailed description of the parts, but may be briefly reviewed here. During the ordinary operation of the plow the beams and plow bodies carried thereby are in their lowered position and motion is continuously transmitted by the mechanism heretofore described from the ground wheels to the rotary shaft 67, carrying the ratchet wheels. If, for any reason, it is desired to raise any pair of plows, the corresponding rope, which is led to a point convenient for the operator, is pulled to bring the pawl attached thereto into engagement with the corresponding ratchet. The latch 75 is then drawn by its spring into engagement with its catch plate to hold the pawl in engagement with the ratchet and thereby the yoke 71 is thrown over beyond the dead center into the position shown in Fig. 10, at which point the pawl is thrown out of engagement with the ratchet by reason of the latch 75 coming in contact with the stationary roller 84. The yoke, however, having passed the dead center, remains in this position until further manual intervention, the corresponding plows being held in their raised position. As before described, when it is desired to again lower the plows a sufficient pull is given to the rope to throw the yoke back over the dead center, when it swings over to the position shown in Figs. 8 and 9, dropping the bottoms controlled thereby. When it is desired to raise all the plows the ropes may be pulled together though ordinarily it is found more convenient to pull them successively.

My invention provides a simple and eminently practical means for raising the plows by power and without greatly increasing the weight or extent of the apparatus or excessively multiplying the parts, or increasing the cost of the implement.

I claim:

1. In a device of the class described, a frame, ground wheels journaled thereon, a series of plow members independently pivoted to the frame, a transverse shaft journaled on the frame, a series of ratchet wheels secured to the shaft at intervals, an arm pivoted on the shaft adjacent each ratchet wheel, a pawl carried by said arm adapted to engage the ratchet, the pawl being so positioned on the arm that it extends upwardly when the arm is in the rearward position and downwardly when the arm is in the forward position, and means for exerting a forward pull on the pawl in either position, to throw said pawl into engagement with the ratchet when the arm is in the rearward position and to disengage the pawl from the ratchet when the arm is in the forward position, means driven by one of the ground wheels for giving the shaft a rotation in the same direction as said ground wheel, and a substantially horizontally movable connection from each said arms to a corresponding plow member for raising the latter when the pawl is thrown into engagement with the ratchet.

2. A gang plow comprising a frame, a series of plow members independently pivoted to the frame, a ground wheel journaled on the frame, a shaft journaled on the frame, sprockets on said shaft and ground wheel, respectively, a chain connecting said sprockets for rotating the shaft in the same direction as the ground wheel, a ratchet secured to said shaft, an arm pivoted on said shaft, a pawl on the arm adapted to engage the ratchet, an oscillatory shaft mounted upon one of the plow members, an arm on the last said shaft, a connection from said arm to the aforesaid pawl carrying arm, a second arm adjustably secured to the oscillatory shaft, and connections therefrom to the plow beam to raise the latter.

3. A gang plow comprising a frame, a series of plow members independently pivoted thereto, a transverse shaft journaled on the frame, a ground wheel journaled on the shaft, sprockets on said shaft and ground wheel respectively, a sprocket chain for driving the shaft in the same direction as the ground wheel, a series of ratchets on said shaft, an arm pivoted on the shaft adjacent each said ratchet, a pawl on the arm adapted to engage the ratchet, an oscillatory shaft for each said arm journaled on a plow member, an arm on said oscillatory shaft, a connection from the last said arm to the arm pivoted on the first mentioned shaft, a second arm journaled with respect to said oscillatory shaft and adapted to be adjustably connected thereto, a lever pivoted on the plow beam, a gage wheel carried by the lever, and a connection from said lever to the arm adjustable upon the oscillatory shaft to raise the plow member.

4. A gang plow comprising a frame and a series of plow members pivoted thereto, means for lifting the plow members comprising a constantly rotating shaft, means for rotating the same, a series of ratchet wheels on the shaft, a series of pivoted arms each connected to one or more of the plow members, a pawl carried by each arm, a catch plate mounted upon each pawl, a latch extending through the catch plate and adapted to engage the pawl when the latter is thrown into engagement with its ratchet, and stationary means adapted to be engaged by the latch to disengage it from the pawl and disengage the latter from the ratchet wheel.

5. In an implement of the class described, a frame, a series of plow members pivoted thereto, a rotary shaft mounted on and above the frame, a ground wheel, sprockets on the ground wheel and shaft respectively, a chain connecting said sprockets for rotating the shaft in the same direction as the ground wheel, a series of ratchet wheels fixed upon the shaft at suitable intervals with their teeth arranged to point forwardly when above the axis of the shaft, a yoke embracing each ratchet and pivoted to the shaft, a pair of links pivoted to each yoke and upwardly bent intermediate their ends, and a rod also pivoted to each pair of links and connected to one or more of the plow members for raising the same, a pawl pivoted on the yoke, a stop fixed upon the frame and adapted to withdraw the pawl from engagement with the ratchet when the pivot between the links and yoke passes the dead center with reference to the rotating shaft.

6. In an implement of the class described, a frame, a series of plow members pivoted thereto, a rotary shaft mounted on and above the frame, a ground wheel, sprockets on the ground wheel and shaft respectively, a chain connecting said sprockets for rotating the shaft in the same direction as the ground wheel, a series of ratchet wheels fixed upon the shaft at suitable intervals with their teeth arranged to point forwardly when above the axis of the shaft, a yoke embracing each ratchet and pivoted to the shaft, a pair of links pivoted to each yoke and upwardly bent intermediate their ends, and a rod also pivoted to each pair of links and connected to one or more of the plow members for raising the same, a pawl pivoted on the yoke, a latch engaging the pawl to hold it in engagement with the ratchet and a stop mounted upon the frame in a position to be engaged by the latch and to withdraw the same from engagement with the pawl and the latter from engagement with the ratchet.

7. In an implement of the class described, a frame, a series of plow members pivoted thereto, a rotary shaft mounted on and above the frame, a ground wheel, sprockets on the ground wheel and shaft respectively, a chain connecting said sprockets for rotating the shaft in the same direction as the ground wheel, a series of ratchet wheels fixed upon the shaft at suitable intervals with their teeth arranged to point forwardly when above the axis of the shaft, a yoke embracing each ratchet and pivoted to the shaft, a pair of links pivoted to each yoke and upwardly bent intermediate their ends, and a rod also pivoted to each pair of links and connected to one or more of the plow members for raising the same, a pawl pivoted on the yoke, a loop mounted on the back of the pawl, a latch pivoted on the yoke extending through and engaging the loop to hold the pawl in engagement with its ratchet, and a stop mounted upon the frame in a position to be engaged by said latch to withdraw the latter from engagement and the pawl from engagement with the ratchet.

8. In an implement of the class described, a frame, a series of plow members pivoted to the frame, a transverse rotary shaft mounted on and above the frame, a ground wheel, sprockets on the ground wheel and shaft respectively, a chain connecting said sprockets for rotating the shaft in the same direction as the ground wheel, a series of ratchets mounted upon the shaft, an arm carrying a pawl mounted adjacent each ratchet for engagement of the pawl therewith, a connection from the arm to a plow body, the construction being such that the arm and connection are adapted to be thrown past the dead center with reference to the shaft, a pawl mounted on the arm to engage the ratchet and a connection to the pawl adapted by a pull to throw the pawl into engagement with its ratchet when the parts are in position with the plow lowered and to throw the arm and link past the dead center when the parts are in the position in which the plow member is raised.

CLEMENT W. MICHAEL.

Witnesses:
JOHN B. MACAULEY,
ROBERT DOBBERMAN.